United States Patent [19]

Kästele et al.

[11] Patent Number: 5,078,747
[45] Date of Patent: Jan. 7, 1992

[54] COMPOSITION IN THE FORM OF AN AQUEOUS DISPERSION AND PROCESS FOR THE TREATMENT OF FIBER MATERIALS: POLYETHYLENE AND ORGANOPOLYSILOXANE AMIDE DERIVATIVE

[75] Inventors: Xaver Kästele, Neusäss; Harald Chrobaczek, Augsburg; Günther Tschida, Schwabmünchen; Ingeborg Schlichting, Ettringen, all of Fed. Rep. of Germany

[73] Assignee: Ciba-Geigy Corporation, Ardsley, N.Y.

[21] Appl. No.: 560,690

[22] Filed: Jul. 31, 1990

[30] Foreign Application Priority Data

Aug. 5, 1989 [DE] Fed. Rep. of Germany ....... 3926005
Mar. 7, 1990 [DE] Fed. Rep. of Germany ....... 4007136

[51] Int. Cl.$^5$ .................... C09D 123/30; C08T 3/05; C08L 23/06; D06M 15/22
[52] U.S. Cl. .......................................... 8/181; 8/115.6; 8/115.7; 8/196; 8/128.1; 8/128.3; 252/8.6; 252/8.8; 252/8.9
[58] Field of Search ..................... 252/8.8; 8/181, 196, 8/128 R

[56] References Cited

U.S. PATENT DOCUMENTS

| | | | |
|---|---|---|---|
| 3,565,840 | 2/1971 | Mirabile et al. | 106/8 |
| 3,853,607 | 12/1974 | Iyengar et al. | 117/138 |
| 3,956,350 | 5/1976 | Pusch et al. | 8/495 |
| 4,098,701 | 7/1978 | Burrill et al. | 252/8.6 |
| 4,211,815 | 7/1980 | Deiner | 428/290 |
| 4,620,878 | 11/1986 | Gee | 106/287.16 |
| 4,767,646 | 8/1988 | Cordova | 427/387 |

FOREIGN PATENT DOCUMENTS

| | | |
|---|---|---|
| 5829 | 12/1979 | European Pat. Off. . |
| 0342830 | 11/1989 | European Pat. Off. . |
| 0342834 | 11/1989 | European Pat. Off. . |
| 63-227680 | 9/1988 | Japan . |
| 63-265955 | 11/1988 | Japan . |
| 8808436 | 11/1988 | PCT Int'l Appl. . |
| 1198615 | 7/1970 | United Kingdom . |
| 2036052 | 6/1990 | United Kingdom . |

OTHER PUBLICATIONS

Derwent Abstracts 88-356389/50 of JP63265955.
Derwent Abstracts 88-310811/44 of JP63:227680.

*Primary Examiner*—A. Lionel Clingman
*Attorney, Agent, or Firm*—George R. Dohmann; Edward McC. Roberts

[57] ABSTRACT

The present application relates to a composition in the form of an aqueous dispersion containing
(1) polyethylene dispersed in a known manner and having certain physical data,
(2) organopolysiloxanes having nitrogen-containing groups in dispersed form, in which at least some of the nitrogen is present in the form of amido groups and the remainder is present in the form of primary and secondary amino groups and
(3) if appropriate known softening agents in dispersed or dissolved form.

A process for softening treatment of fiber materials is also claimed.

17 Claims, No Drawings

COMPOSITION IN THE FORM OF AN AQUEOUS DISPERSION AND PROCESS FOR THE TREATMENT OF FIBER MATERIALS: POLYETHYLENE AND ORGANOPOLYSILOXANE AMIDE DERIVATIVE

The present invention relates to a composition in the form of an aqueous dispersion which contains polyethylene wax having certain characteristic data, polyorganosiloxanes having nitrogen-containing groups, at least some of which are modified in a certain manner, and if appropriate known softening agents in dispersed or dissolved form. A process for softening treatment of fiber materials using such compositions is also claimed.

It has been known for a long time that the technological properties such as, for example, the tear strength and gloss, of woven fabrics can be improved using aqueous dispersions of incipiently oxidized polyethylenes ("polyethylene waxes") (compare, for example, DE-B-1,619,065). Polyorganosiloxanes which contain aminoalkyl groups are also used, inter alia, for treatment of textiles, to which they impart a very pleasant soft hand, the "silicone hand", are likewise known (compare, for example, GB-A-2,036,052 and DE-A-3,723,697).

If an attempt is now made to combine such polyethylene dispersions with dispersions of polyorganosiloxanes containing aminoalkyl groups in one product so that the useful properties inherent in these two product classes can be utilized in the treatment of fiber materials, unexpected considerable difficulties result here.

Combination of such dispersions often leads to instabilities, leading to the dispersions becoming pasty. Such dispersions often also discolor—especially at elevated temperatures—and become yellow to brownish. Their use on textiles is thus impaired or at any rate limited. Finally, it should also be noted that when the dispersions according to the prior art are used for the treatment of fiber materials, above all textiles, by the padding process, especially in combination with other auxiliaries customary in the textile industry—cellulose crosslinking agents may be mentioned above all here—a build-up very readily forms on rollers, which leads to spots on the fiber material which are almost impossible to remove again.

The inventors have set themselves the object of overcoming these difficulties.

Surprisingly, it has now been found that the disadvantages described do not occur with the specific compositions described in patent claim 1. Preferred embodiments are claimed in subclaims 2 to 11. A process for softening treatment of fiber materials is moreover claimed in claims 12 to 16.

The emulsifiable polyethylene (polyethylene wax) contained in constituent (1) is known and is described in detail in the prior art (compare, for example, DE-C-2,359,966, DE-A-2,824,716 and DE-A-1,925,993). The emulsifiable polyethylene is as a rule a polyethylene having functional groups, in particular COOH groups, some of which can be esterified. These functional groups are introduced by oxidation of the polyethylene. However, it is also possible to obtain the functionality by copolymerization of ethylene with, for example, acrylic acid. The emulsifiable polyethylenes contained in constituent (1) have a density of at least 0.91 g/cm³ at 20° C., an acid number of at least 5 and a saponification number of at least 10. Compositions (finishing agents) according to the invention containing those emulsifiable polyethylenes which have a density of 0.95 to 1.05 g/cm³ at 20° C., an acid number of 10 to 60 and a saponification number of 15 to 80 are particularly preferred. This material is generally obtainable commercially in the form of flakes, lozenges and the like. Constituent (1), that is to say the dispersion of the emulsifiable polyethylene, is preferably employed in the composition according to the invention in amounts of 5 to 95, in particular 55 to 90% by weight, based on the composition, in the form of a dispersion containing 20 to 35% by weight of polyethylene wax. The amounts of 5 to 95 and 55 to 90% by weight relate to the amount of this dispersion in the total composition.

The polyethylene wax is employed in the form of dispersions. Various emulsifiers are suitable for their preparation. These emulsifiers can assist the soft hand effect of the compositions during use thereof. The preparation of the dispersions is described in detail in the prior art. Nonionic emulsifiers, in particular ethoxylated alkylphenols and ethoxylates of branched-chain alcohols, are preferred, these as a rule being employed in amounts of 20 to 35% by weight, based on the polyethylene wax to be emulsified. Alkylphenol ethoxylates and the alcohol ethoxylates mentioned containing about 5 to 25 added-on ethylene oxide units have proved to be particularly suitable.

Constituent (2) of the compositions according to the invention comprises selected polyorganosiloxanes in dispersed form. The polyorganosiloxanes contain nitrogen-containing groups, each group containing at least one but preferably two nitrogen atoms. The polyorganosiloxanes here contain at least 2 such groups, which are bonded to the silicon by hydrocarbon radicals. The nitrogen-containing groups preferably correspond to the formula

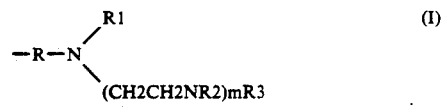

in which m is 0 or 1, R is a divalent hydrocarbon radical having 2 to 10 carbon atoms, which can also be interrupted by an oxygen bridge, preferably a hydrocarbon radical having 3 or 4 carbon atoms, and in which R1 is hydrogen, an alkyl radical having 1 to 4 carbon atoms or the radical —COR4, R2 is hydrogen, an alkyl radical having 1 to 4 carbon atoms or the radical —COR4, R3 is hydrogen or an alkyl radical having 1 to 4 carbon atoms and R4 is an unsubstituted or substituted alkyl radical having 1 to 4 carbon atoms, with the proviso that R1 and R2 are present as radical —COR4 in an average amount of at least 25%, preferably to an amount of 50 to 100% the portions of R1 and R2 lacking to make 100% denoting, independently of one another, hydrogen or an alkyl radical having 1 to 4 carbon atoms.

As can be seen from this formula and its explanations, it is essential to the invention that the nitrogen in the nitrogen-containing groups is present to the extent of at least 25%, preferably to the extent of 50 to 100%, in the form of amido groups. Those polyorganosiloxanes in which m in the abovementioned formula is 1 are particularly preferred.

The average value of at least 25% of radicals of the formula —COR4 according to the above formula (or correspondingly higher average values) can also be achieved by mixing polyorganosiloxanes having nitrogen-containing groups, in which the nitrogen is present exclusively in the form of primary and if appropriate secondary amino groups, with a polyorganosiloxane having a correspondingly higher content of amido groups. The term "on average" is to be understood in this context. The nitrogen-containing groups can be either in the terminal position or in a lateral position. From the above statements it can be seen that the nitrogen atoms in the nitrogen-containing groups are present in the form of primary or secondary amino groups and in the form of amido groups (—NHCO—).

Particularly preferred compositions according to the invention are those which, as stated in patent claims 5 and 6, contain polydialkylsiloxanes, the nitrogen-containing groups of which correspond to the above formula (I) and in which at least some of the radicals R4—defined above—contain a hydroxyl group as a substituent. Preferably, in these polysiloxanes, at least some of the radicals R4 represent a linear alkyl group having a terminal ($\omega$—)hydroxyl group. Suitable polysiloxanes having radicals R4 substituted by a hydroxyl group and their preparation are described in EP-A-0,342,830 and in EP-A-0,342,834.

The use of these preferred polysiloxanes containing hydroxyl groups in the compositions according to the invention provides particular advantages in respect of the soft hand of the finished goods.

The degree of polymerization of the polysiloxanes also plays a certain role. Compositions (or constituents (2) thereof) in which the underlying organopolysiloxanes have a viscosity at 20° C. of up to 100,000 mPa.s, in particular 100 to 20,000 mPa.s and especially preferably 100 to 5,000 mPa.s, can be used in the context of the process according to the invention for softening treatment of fiber material, since particularly favorable effects are achieved with these. Organopolysiloxanes having a viscosity of more than 100,000 mPa.s cannot be used, since these lead to difficulties in respect of build-up on rollers when used in the padding process.

In addition to the groups necessarily present and explained in more detail above and the statements on the viscosity, there are no particular restrictions in respect of the polysiloxanes which can be used. Thus, straight- and branched-chain polysiloxanes, in particular polydimethylsiloxanes, having nitrogen-containing groups and which also contain terminal OH groups, lateral hydrocarbon radicals or substituted hydrocarbon radicals, such as vinyl and phenyl radicals, or also small amounts of hydrogen bonded to silicon can be employed, and the expert will have no trouble at all in selecting the correct starting substances.

The preparation of the dispersions employed as constituent (2) is known. Here also the expert will have no trouble in selecting the process suitable for the particular organopolysiloxane using the emulsifiers customary for this. In this context, reference may be made to, for example, GB-B-1,570,983, EP-A-138,192 and DE-A-3,723,697. All the dispersions (2) prepared by known processes can thus in principle be employed, so-called microemulsions being particularly suitable. Nonionic emulsifiers are in general preferred. Secondary alcohol ethoxylates and ethoxylates of branched-chain alcohols, as well as alkylphenolethoxylates having as a rule 3 to 15, in particular 5 to 10, ethyleneoxide units per alcohol radical or phenol radical have proved to be particularly suitable. The emulsifiers are as a rule employed in amounts of 10 to 80% by weight, based on the siloxane to be emulsified.

Polyorganosiloxanes of the type mentioned are commercially available and are marketed, for example, by Dow Corning Corp. under the designation X2-8088 and Q2-8357.

The concentration of the dispersions (constituent 2) varies within the customary limits, 10 to 40% strength dispersions most frequently being used.

These dispersions (constituent 2) are preferably used in the compositions according to the invention in amounts of 5 to 95, in particular 10 to 45% by weight (in the form of a dispersion which contains 10 to 20% by weight of polysiloxanes). These values of 5 to 95 and 10 to 45% by weight relate to the content of such a dispersion in the compositions according to the invention.

If appropriate, the compositions according to the invention can contain known softening agents in dispersed or dissolved form as constituent (3).

Suitable such known softening agents of this type are in principle all such known substances as long as compatibility with constituents (1) and (2) exists. Preferred examples which may be mentioned are hydrophilizing silicones. These are in general polydimethylsiloxanes containing incorporated polyethoxy, or polypropoxy or polyethoxy/propoxy groups.

Other known constituents (3) are paraffin emulsions or the condensation products known from DE—C-2,318,906.

The compositions according to the invention contain the constituents (3) in amounts of 0 to 30, in particular 0 to 15% by weight. These values relate to the content of a dispersion or solution containing 20 to 30% by weight of softening agent.

The composition according to the invention is prepared in a simple manner by mixing the constituents, advantageously at normal to slightly elevated temperature. A pH of about 7 to 9 is established during this mixing.

The present invention furthermore relates to a process for the softening treatment of fiber materials, in particular textile material. It is easily possible here to prepare finishing liquors from constituents (1), (2) and if appropriate (3) in a known manner, to treat the material with these liquors and to finish the material in a known manner by drying and if appropriate heating or carrying out a condensation reaction. The finishing process according to the invention is particularly preferably carried out here in an aqueous liquor, the compositions according to the invention being employed.

The fiber treatment, in particular textile treatment, is carried out with amounts of constituents (1), (2) and if appropriate (3) or of compositions according to the invention such that an add-on level of about 0.2 to 3% by weight of active substance (polyethylene wax/organopolysiloxane having nitrogen-containing groups and if appropriate active substance of constituent (3)) results on the treated material. For this, the compositions are employed, for example in the padding process, in the form of liquors which contain 15 to 80, in particular 20 to 60 g/l of the compositions or corresponding amounts of the constituents mentioned. Corresponding amounts are to be used in the exhaustion process which can likewise be used. All other known processes can of course also be employed.

In principle, it is also easily possible to combine the softening fiber treatment with other known finishing processes. For example, if textile materials are to be treated according to the invention, examples which may mentioned of known finishing agents which can be used are dressing and anti-slip agents, antistatics and cellulose crosslinking agents, and if appropriate the catalysts needed for hardening. The amounts of customary textile auxiliaries also used here are known to the expert.

Fiber materials are to be understood as meaning paper, leather and in particular textiles, which can be in the form of woven fabrics, knitted fabrics or non-wovens. They can consist here of naturally occurring fibers (for example cotton or wool fibers) or synthetic fibers (for example polyester, polyamide or polyacrylonitrile fibers), and it is of course also possible for the textiles to be built up from all the known fiber mixtures.

Using the subject-matter according to the invention, it is possible for the first time to combine polyethylene dispersions and polysiloxanes having nitrogen-containing groups in dispersion form, and at the same time—which is particularly surprising— products are formed which are largely stable towards discoloration—even at elevated temperature over a prolonged period of time and which also do not form a paste during storage and give mechanically stable liquors, even in the presence of cellulose crosslinking agents, and which do not lead to build-upon rollers being formed in the customary padding method, even when they are used together with cellulose crosslinking agents.

Experts have in the past made considerable efforts to solve these various problems. However, their solution has only become possible with the subject-matter of the invention, the modified polyorganosiloxanes used in constituent (2) playing the predominant role.

The present invention will now be explained in more detail with the aid of the following examples, percentage data denoting percent by weight.

EXAMPLE 1 (ACCORDING TO THE INVENTION)

Preparation of a dispersion A1 according to the invention 150 g of the commercial product "Q2-8357" (manufacturer: Dow Corning Corp.) are emulsified in 850 g of an aqueous solution, containing 3.3 g of 60% strength acetic acid, of 30 g of a secondary C11-15-alcohol ethoxylate (on average 5 ethoxy groups) and 70 g of a secondary C11-15-alcohol ethoxylate (containing on average 7 ethoxy groups) in accordance with the information in DE-A-3,723,697.

A polyethylene wax dispersion is moreover prepared in a known manner by heating the constituents at about 110° C. under a slight excess pressure, using the following constituents: 281 g of a polyethylene wax (acid number 20 to 30, saponification number 30 to 50, density at 20° C. about 0.96 g/cm$^3$) and 719 g of an aqueous solution, containing 4.5 g of KOH, of 63 g of an isotridecylethoxylate containing on average 20 ethoxy groups.

A dispersion A1 is now prepared by mixing 3 parts of the polysiloxane emulsion with 7 parts of the polyethylene wax dispersion, a white finely divided dispersion having a pH of 7.6, a turbidity number of 9 (measured using a transmitted light turbidity meter from Dr. Lange at a dilution of 1 g/l) and a viscosity of 25 mPa.s, which remains constant during storage at 60° C. for at least 7 days, being formed.

EXAMPLE 2 (ACCORDING TO THE INVENTION)

Preparation of a dispersion A2 according to the invention

Example 1 was repeated with modifications a) and b):

a) a different polysiloxane having the following data was used:

The nitrogen-containing side groups of the siloxane used each had 2 nitrogen atoms. About 25% of all the side groups contained a secondary amino group in the chain and a primary amino group at the end of the chain. About 75% of the side chains likewise contained a secondary amino group in the chain, an amido group in the chain and a terminal hydroxyl group. They had a structure according to claim 6. The siloxane used had a viscosity of the order of 1000 mPa.s.

b) 4 parts of polysiloxane emulsion were mixed with 6 parts of the polyethylene wax dispersion; a dispersion A2 which differed from dispersion A1 in the following data resulted:
Turbidity number 21,
Viscosity 10 mPa.s.

EXAMPLE 3 (COMPARISON EXAMPLE)

Preparation of a comparison dispersion B 66 parts of a polyethylene wax dispersion obtained in the same maner at 110° C. by emulsification of 280 g of polyethylene wax (for the data see dispersion A1) in 720 g of an aqueous solution containing 4 g of KOH, 45 g of a nonylphenolethoxylate having on average 9 ethoxy groups and 28 g of a fatty alcohol polyglycol ether having on average 7 ethoxy groups are mixed with 34 parts of a silicone emulsion which has been obtained by emulsification of 250 g of a polydimethylsiloxane containing exclusively aminoethylaminopropyl groups as nitrogen-containing groups (viscosity 350 mPa.s, nitrogen content 0.7%) in 750 g of an aqueous solution, containing 30 g of propylene glycol, of 30 g of an emulsifier mixture of C 10 to 12-alcohol ethoxylate having on average 6 ethoxy groups. A slightly yellowish dispersion is obtained.

Checking the storage stability

If dispersions A1, A2 and B are stored at elevated temperature for a prolonged period of time, different discoloration occurs. Whereas dispersions A1 and A2 according to the invention suffer only a slight deepening in color on storage, dispersion B) according to the prior art exhibits distinct disadvantages in this context. Details can be seen from the following table:

| | Color of the dispersion | | | |
|---|---|---|---|---|
| Dispersion | Original | after 1 month at room temperature | after 1 day at 60° C. | after 1 week at 60° C. |
| (A1), (A2) (according) to the invention) | white | slightly yellowish | slightly yellowish | yellowish |
| (B) prior art (comparison) | slightly yellowish | yellow-brown | yellowish to yellow | intensely yellow-brown |

Checking the mechanical stability

To check the mechanical stability (stability on shaking and build-up on rollers), aqueous liquors are prepared using the dispersions prepared as described above, these liquors also containing, in addition to 35 g/l of dispersions A1, A2 or B, 55 g/l of an approximately 75% strength cellulose crosslinking agent (dimethyloldihydroxyethyleneurea etherified with methanol), 16.5 g/l of magnesiumchloridehexahydrate and 0.2 g/l of sodium fluoborate.

These liquors are now tested as follows:

a) Stability to shaking

For this, 300 ml of these liquors are shaken in a 500 ml wide-necked bottle together with pieces of fabric 20×35 cm in size (cotton ticking of 130 g/m$^2$) for 1 hour at 250 oscillations per minute (amplitude 1.9 cm). The samples of fabric are then squeezed off and dried at 110° C. for 10 minutes.

b) Build-up on rollers

For this, the liquors were used on a continuously operating padding unit (running time 1 hour). The test fabric is cotton twill (240 g/m$^2$).

After the test, the liquors, the padder rollers and the fabric samples are evaluated to give the following result:

| Dispersion | Shaken sample | | | Build-up on rollers | | |
|---|---|---|---|---|---|---|
| | Liquor | Padder roller | Fabric | Liquor | Padder roller | Fabric |
| (A1), (A2) (according to the invention) | no precipitates | no residue | no spots | unchanged | no deposits | no spots |
| (B) (prior art) | heavy precipitates | significant residues | significant spots | significant precipitates | heavy deposits | heavy spotting |

The superiority of the invention is illustrated by this comparison.

Finishing

A cotton poplin (about 120 g/m$^2$) is padded with the liquors prepared as described above (liquor pick-up about 72%), and after drying (10 minutes at 100° C.), condensation is also carried out for a short time at 140° C.

In addition to a good resistance to creasing, the fabrics show a very soft, pleasant supple hand. No differentiation in the hand properties is possible here between the individual liquors. In whiteness, however, the fabric treated using dispersion B shows a clearly detectable yellowing in comparison with the other two fabrics (treatment with dispersion A1 or A2).

EXAMPLE 4 ( COMPARISON EXAMPLE)

Preparation of comparison dispersion C

A dispersion C was prepared using the same polyethylene wax dispersion as had been used to prepare dispersions A1 and A2 according to the invention. This polyethylene wax dispersion was mixed with the same silicone emulsion as in the case of the preparation of comparison dispersion B; the mixing ratio was the same as in the case of comparison dispersion B. The following results were obtained:

| | Dispersion A2 (according to the invention) | C (comparison) |
|---|---|---|
| Storage stability | | |
| Original | white | white |
| After 1 month at room temperature | slightly yellowish | intensely yellow |
| After 1 day at 60° C. | slightly yellowish | yellow |
| After 1 week at | yellowish | intensely yellow- |

| | Dispersion A2 (according to the invention) | C (comparison) |
|---|---|---|
| 60° C. | | brown |
| Stability to shaking | | |
| Liquor | no precipitates | precipitates |
| Padder roller | no residue | no residue |
| Fabric | no spots | significant spots |
| Build-up on rollers | | |
| Liquor | unchanged | unchanged |
| Padder roller | no deposits | heavy deposits |
| Fabric | no spots | slight spotting |

In the whiteness properties of finished cotton knitted goods when high temperatures (up to 190° C.) are used, C shows a significantly poorer result (about 15–35 Ganz points; in this context compare "Methoden und Einsatzmööglichkeiten der farbmetrischen Weissbewertung von Textilien (Methods and possible uses of colorimetric whiteness evaluation of textiles)" by R. Griesser, Ciba-Geigy Brochure No. 9140 d, 1981 edition; see also "Textilveredlung" 18 (1983), No. 5, pages 157–162).

In another experiment, a dispersion was prepared analogously to dispersion A2 according to the invention and a comparison dispersion was prepared analogously to C, these dispersions containing the same products as dispersions A2 and C described but in amounts such that the silicone content of these two dispersions was the same. The results obtained with these two dispersions were the same as those which can be seen from the above comparison (A2-C).

We claim:

1. A composition in the form of an aqueous dispersion which comprises (1) dispersed polyethylene wax having a density of at least 0.91 g/cm$^3$ at 20° C., an acid number of at least 5 and a saponification number of at least 10;

(2) dispersed polyorganosiloxanes having nitrogen-containing groups, wherein at least 25 percent of the nitrogen-containing groups are amido groups and the remainder of the nitrogen-containing groups are primary and secondary amino groups; and (3) if appropriate, a softening agent, said softening agent being dispersed or dissolved in the aqueous dispersion.

2. A composition according to claim 1, which contains as constituent (1) polyethylene waxes having a density of 0.95 to 1.05 g/cm$^3$, an acid number of 10 to 60 and a saponification number of 15 to 80, in dispersed form.

3. A composition according to claim 1, which contains as constituent (2) polydialkylsiloxanes, the nitrogen-containing groups of which correspond to the formula

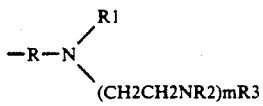

in which m is 0 or 1, R is a divalent hydrocarbon radical having 2 to 10 carbon atoms, which can also be interrupted by an oxygen bridge, and in which R1 is hydrogen, an alkyl radical having 1 to 4 carbon atoms or the radical —COR4, R2 is hydrogen, an alkyl radical having 1 to 4 carbon atoms or the radical —COR4, R3 is hydrogen or an alkyl radical having 1 to 4 carbon atoms and R4 is an unsubstituted or substituted alkyl radical having 1 to 4 carbon atoms, with the proviso that R1 and R2 are present as radical —COR4 in an average amount of at least 25%.

4. A composition according to claim 3, which contains as constituent (2) polydialkylsiloxanes in which the radicals R1 and R2 are present as radical —COR4 in an amount of 50 to 100%.

5. A composition according to claim 4, in which either all the radicals R4 present or some of these are linear or branched alkyl radicals containing a hydroxyl group as a substituent.

6. A composition according to claim 5, in which all or some of the radicals R4 are linear alkyl radicals having a terminal (ω—)hydroxy group.

7. A composition according to claim 6, which contains constituent (1) to an extent of 5 to 95% by weight (in the form of a 20 to 35% strength polyethylene wax dispersion) and constituent (2) to an extent of 95 to 5% by weight (in the form of a 10 to 20% strength dispersion of a polyorganosiloxane having nitrogen-containing groups), and if appropriate a softening agent, the sum of these constituents making up 100% by weight.

8. A composition according to claim 7, which contains 55 to 90% by weight of constituent (1), 10 to 45% by weight of constituent (2) and 0 to 30% by weight of constituent (3) the sum of these constituents making up 100% by weight.

9. A composition according to claim 8, in which constituent (1) has been prepared using nonionic emulsifiers, the emulsifiers having been employed in amounts of 20 to 35% by weight, based on the polyethylene wax.

10. A composition according to claim 9, in which constituent (2) has been prepared using nonionic emulsifiers, the emulsifiers having been employed in amounts of 10 to 80% by weight, based on the polysiloxane.

11. A composition of claim 10 wherein constituent (3) is a softening agent selected from the group consisting of paraffin emulsifiers and polydimethylsiloxanes containing incorporated polyethoxy, polypropoxy or polyethoxy/propoxy group.

12. A process for softening fiber materials, which comprises applying to the fiber materials a composition as claimed in claim 1.

13. The process according to claim 12, wherein polyethylene waxes having a density of 0.95 to 1.05 g/cm$^3$, an acid number of 10 to 60 and a saponification number of 15 to 80 in dispersed form are employed as constituent (1) and polyorganosiloxanes having nitrogen-containing groups of the formula

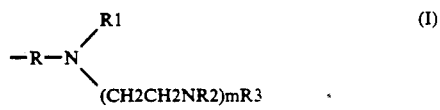

in which m is 0 or 1, R is a divalent hydrocarbon radical having 2 to 10 carbon atoms, which can also be interrupted by an oxygen bridge, and in which R1 is hydrogen, an alkyl radical having 1 to 4 carbon atoms or the radical —COR4, R2 is hydrogen, an alkyl radical having 1 to 4 carbon atoms or the radical —COR4, R3 is hydrogen or an alkyl radical having 1 to 4 carbon atoms and R4 is an optionally substituted alkyl radical having 1 to 4 carbon atoms, with the proviso that R1 and R2 are present as radical —COR4 in an average amount of at least 25%, are employed as constituent (2).

14. The process according to claim 13, wherein polyorganosiloxanes in which either all the radicals R4 present or some of these are linear or branched alkyl radicals which contain a hydroxyl group as a substituent are employed as constituent (2).

15. The process according to claim 14, wherein all or some of the radicals R4 are linear alkyl radicals having a terminal (ω—) hydroxyl group.

16. The process according to claim 12, wherein customary textile auxiliaries, are also used.

17. A process of claim 16 wherein the textile auxiliaries are selected from the group consisting of anti-slip agents, antistatics and cellulose cross-linking agents.

* * * * *